(12) United States Patent
Will

(10) Patent No.: US 7,636,893 B2
(45) Date of Patent: Dec. 22, 2009

(54) CLIENT SERVER APPROACH FOR INTERACTIVE UPDATES OF GRAPHICAL USER INTERFACES ON INTRANETS

(75) Inventor: Alexander Will, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 614 days.

(21) Appl. No.: 10/395,087

(22) Filed: Mar. 25, 2003

(65) Prior Publication Data

US 2003/0184590 A1 Oct. 2, 2003

(30) Foreign Application Priority Data

Mar. 28, 2002 (AU) .................................. PS1459

(51) Int. Cl.
  *G06K 15/00* (2006.01)
(52) U.S. Cl. ...................... 715/760; 715/748
(58) Field of Classification Search ......... 715/734–738, 715/744–747, 853–855, 760, 762–763, 789, 715/752, 804–806, 748–749; 705/26, 27; 345/473–475; 709/203
  See application file for complete search history.

(56) References Cited

U.S. PATENT DOCUMENTS

| 5,668,997 | A |   | 9/1997 | Lynch-Freshner et al. ... 395/683 |
| 5,712,964 | A | * | 1/1998 | Kamada et al. ............ 345/418 |
| 5,926,817 | A |   | 7/1999 | Christeson et al. |
| 5,978,834 | A |   | 11/1999 | Simonoff et al. ............ 709/203 |
| 5,983,190 | A |   | 11/1999 | Trower, II et al. ........... 704/276 |
| 6,052,711 | A |   | 4/2000 | Gish .......................... 709/203 |
| 6,078,322 | A |   | 6/2000 | Simonoff et al. ............ 345/335 |
| 6,161,136 | A |   | 12/2000 | Hyndman et al. .......... 709/223 |
| 6,489,979 | B1 | * | 12/2002 | Belknap et al. ............. 715/854 |
| 6,667,992 | B1 | * | 12/2003 | Yanagawa ................... 370/490 |
| 6,954,737 | B2 | * | 10/2005 | Kalantar et al. .............. 705/50 |
| 7,058,654 | B1 | * | 6/2006 | Burke ......................... 707/102 |
| 7,076,453 | B2 | * | 7/2006 | Jammes et al. ................ 705/26 |
| 2003/0118250 | A1 | * | 6/2003 | Tlaskal et al. ............... 382/284 |
| 2003/0167213 | A1 | * | 9/2003 | Jammes et al. ............... 705/27 |
| 2004/0051728 | A1 | * | 3/2004 | Vienneau et al. ............ 345/723 |

FOREIGN PATENT DOCUMENTS

SE      200301958 A   *  1/2005

* cited by examiner

*Primary Examiner*—Steven P Sax
(74) *Attorney, Agent, or Firm*—Fitzpatrick, Cella, Harper & Scinto

(57) ABSTRACT

A method (1000) and apparatus for generating an interface comprising a plurality of screens, on a first computer (107) for display by a second computer (102) is disclosed. A hierarchical compositing expression representing an arrangement of one or more graphical objects for a first screen of the interface is constructed. A description of the compositing expression is then transmitted to the second computer (102), together with object identifiers corresponding to graphical objects for the first screen. The compositing expression is reconstructed based on the transmitted description and identifiers, where the transmitted identifiers are mapped to a description of each of the graphical objects stored within the second computer (102). The first screen of said interface is then displayed according to the reconstructed compositing expression.

21 Claims, 11 Drawing Sheets

```
circle = new_circle(radius = 5);
rect = new_rect(w=10, h=5);
nary = new_nary(op=over);
attach(circle, nary, 0);
attach(rect, nary, 1);
set_root(nary);
```
FIG. 6(a)
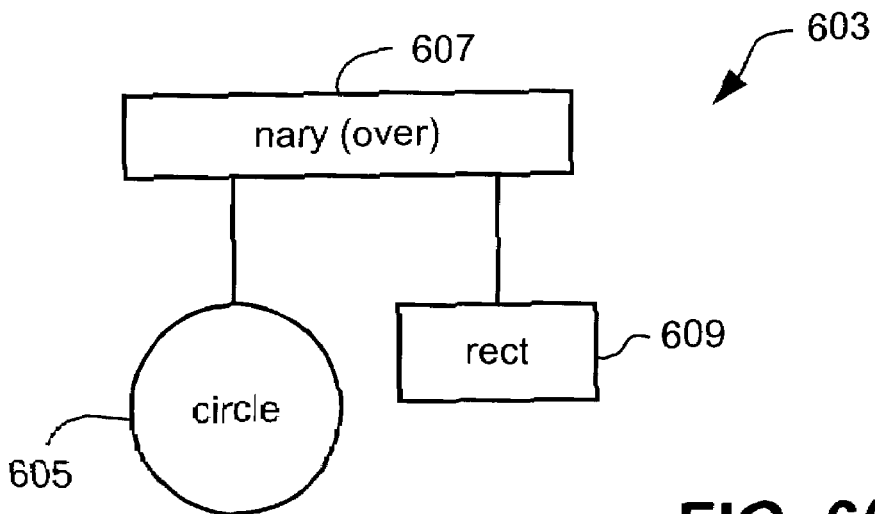
FIG. 6(b)
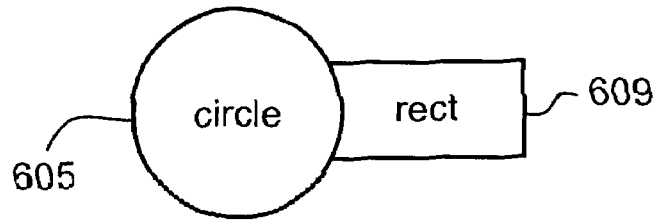
FIG. 6(c)

CLIENT SERVER APPROACH FOR INTERACTIVE UPDATES OF GRAPHICAL USER INTERFACES ON INTRANETS

CROSS-REFERENCE TO RELATED PATENT APPLICATIONS

This application claims the right of priority under 35 U.S.C. §119 based on Australian Patent Application No. PS1459, filed Mar. 28, 2002, which is incorporated by reference herein in its entirety as if fully set forth herein.

TECHNICAL FIELD OF THE INVENTION

The present invention relates generally to graphical user interfaces, and in particular to the provision of such interfaces using a networked client/server system. The present invention relates to a method and apparatus for providing graphical user interfaces using a networked client/server system. The invention also relates to a computer program product including a computer readable medium having recorded thereon a computer program for providing graphical user interfaces using a networked client/server system.

BACKGROUND ART

Before proceeding with a description of the background art, a brief review of terminology to be used throughout the following description is appropriate.

In an object oriented programming environment, such as Visual $C^{++}$, the term "object" is used to refer to a computer software component comprising data structures, and procedures (often referred to as methods) for manipulating the data structures. Objects can communicate with one another by sending messages using some form of communications protocol. The procedures of a particular object can be activated by a message sent from another object, where the interior structure of each object is entirely hidden from any other object (a property referred to as encapsulation). Each object can have one or more associated interfaces, which specify the communication between two objects. For example, each object can have its own private variables and if a procedure contained within a specific object does not refer to non-local variables then the interface of the object is defined by a parameter list contained within the object. Variables of an object store information but do not define how that information is processed.

Objects are derived from a template or type of object, and the collection of objects that are derived from a particular template are said to form a class. Each object in a class is referred to as an 'instance' of that class. A class definition defines the attributes (i.e. properties) of the objects within a particular class. Generally, the objects within a class are ordered in a hierarchical manner such that an object has a parent object (i.e. super-class) at the next higher level in the hierarchy and one or more child objects (i.e. sub-class) at the next lower level. An object is generally mapped to a parent object or a child object by means of a mapping table, often referred to as a sibling table, which is associated with the object.

As described above, each object can have various attributes associated with the object. Attributes can be local to that object, or can be inherited from the parent object. Inheritance is the term given to the manner in which characteristics of objects can be replicated and instantiated in other objects. Attributes of an object can also be inherited from a child object often without limit on the number of inheritances. The object from which all of the objects within the class are derived is referred to as the base class object.

Inheritance is both static by abstract data type and dynamic by instantiation and value. Inheritance rules define that which can be inherited and inheritance links define the parent and child of inheritance attributes.

Generally, an object has a permanent connection with a parent application program. However, some objects (e.g. embedded objects) have no permanent connection with a parent application. In this case, when the object is activated the parent application is generally launched. For example, a button object on a graphical user interface, when activated might cause a certain application program to execute in order to perform some function.

Graphical user interfaces are typically used to present information to an end user in a visually pleasing manner and to allow the user to interact with a corresponding application program, for example, using a pointing device or a keyboard. In particular, with the advent of the Internet, many users have become accustomed to simply providing an Internet browser software application, executing on a client computer, hereinafter referred to as a "client", with an application program reference. The browser software application retrieves information, according to the reference, which is then returned to the client for display as a combination of text, graphics and images.

For the end user, the quality of presentation of information can be an important aspect in choosing a product to purchase or use. This has been well recognised by information technology companies, resulting in the emergence of several software tools for assisting the construction of such graphical interfaces. Some of these tools include processes, which allows a graphical user interface-generating program to execute within browser software on a client. Such tools also allow for the provision of dynamically created content to the user. A further advantage of such software tools is that the client needs only to be configured with a standard web browser, for example, without needing installation or configuration of specialised software for an application being executed on a remote server computer hereinafter referred to as a "server". A still further advantage of such software tools is that a heterogeneous network of clients can be used, where the clients differ in operating systems, central processing units and further, hardware and software configurations. The graphical information can be dynamically generated on such clients requiring a much lower bandwidth than would otherwise be needed if pixel information was directly transmitted to the client from a server.

In addition, since a client does not retain prior knowledge of an application being executed on a remote server, applications can be more easily up-gradable, since such applications need only be updated at the corresponding server. For example, a graphical user interface can be changed completely, without requiring any cooperation from the clients. The ability to easily customise and modify a graphical user interface over time can be an important feature of a product, especially in response to feedback and requests from end users.

Whilst a computer system which allows a graphical user interface generating program to execute on a client is an extremely powerful and useful tool, such a tool can present many limitations and restrictions to a user due to security restrictions which are associated with the graphical user interface. These security restrictions are necessary due to the nature of the Internet, which would otherwise easily permit both unwanted access and destruction of personal data. An additional disadvantage of such a system is that a program executing on a client is therefore not under the direct control of a server.

In addition, in order to graphically display changes in the state of a graphical user interface presented by a server, corresponding client software typically has to periodically poll the server for changes. Such polling often results in the fetching of a newly updated application program as a replacement to an existing one, and execution of this new application program. Polling introduces an extra element of complexity in the writing of such an application program in that the program must be configured to execute the action of polling the server. Additionally, the need to execute a new program introduces inefficiency and slow response time particularly where only small updates are required to a graphical user interface being displayed on a graphical display.

In order to overcome the limitations of conventional client/server computer systems discussed above, software tools have been developed to allow a program to execute on a server in response to a request from a client. Such a program, upon completing the request originating from the client, responds to the client with the requested information embedded within a graphical description included within the response, perhaps even embedding a program for the client to execute. Software tools that allow a program to execute on a server, in response to a request from a client, permit dynamic graphical content generation as well as server data access and manipulation. However, such tools are configured to work over the Internet, which inherently presents unpredictable delays in network traffic, and is driven by client requests rather than server initiative.

Thus, a need clearly exists for an improved method of displaying visual effects on a client, which would otherwise require both significant software and processing power on the part of the client.

SUMMARY OF THE INVENTION

It is an object of the present invention to substantially overcome, or at least ameliorate, one or more disadvantages of existing arrangements.

According to one aspect of the present invention there is provided a method of generating an interface comprising a plurality of screens, on a first computer for display by a second computer, said method comprising the steps of:

(i) constructing a hierarchical compositing expression representing an arrangement of one or more graphical objects for a first screen of said interface;

(ii) transmitting a description of said compositing expression, to said second computer, together with object identifiers corresponding to graphical objects for said first screen;

(iii) reconstructing said compositing expression based on said transmitted description and identifiers, wherein said transmitted identifiers are mapped to a description of each of said graphical objects stored within said second computer;

(iv) displaying said first screen of said interface according to said reconstructed compositing expression; and (v) updating said hierarchical compositing expression and repeating steps (ii) to (v) for each subsequent screen of said interface.

According to another aspect of the present invention there is provided a method of generating an interface, comprising a plurality of screens, on a first computer for display by a second computer, each of said screens comprising one or more graphical objects, wherein each of said graphical objects has an associated identifier, said method comprising the steps of:

(i) storing a first description of each of said graphical objects together with said associated identifiers, within said first computer;

(ii) constructing a hierarchical compositing expression utilising one or more of said stored first descriptions, said hierarchical compositing expression representing an arrangement of graphical objects for a first screen of said interface;

(iii) transmitting a description of said compositing expression, to said second computer, together with object identifiers corresponding to graphical objects for said first screen;

(iv) reconstructing said compositing expression based on said transmitted description and identifiers, wherein said transmitted identifiers are mapped to second descriptions of each of said graphical objects stored within said second computer;

(v) displaying said first screen said interface according to said reconstructed compositing expression; and (vi) updating said hierarchical compositing expression and repeating steps (iii) to (v) for each subsequent frame of said interface.

According to still another aspect of the present invention there is provided a method of displaying an interface comprising a plurality of screens, on a first computer, said interface being generated by a second computer, said method comprising the steps of:

(i) constructing a hierarchical compositing expression representing an arrangement of one or more graphical objects for a first screen of said interface;

(ii) transmitting a description of said compositing expression, to said first computer, together with object identifiers corresponding to graphical objects for said first screen;

(iii) reconstructing said compositing expression based on said transmitted description and identifiers, wherein said transmitted identifiers are mapped to a description of each of said graphical objects stored within said first computer;

(iv) displaying said first screen of said interface according to said reconstructed compositing expression; and (v) updating said hierarchical compositing expression and repeating steps (ii) to (v) for each subsequent screen of said interface.

According to still another aspect of the present invention there is provided an apparatus for generating an interface comprising a plurality of screens, on a first computer for display by a second computer, said apparatus comprising:

construction means for constructing a hierarchical compositing expression representing an arrangement of one or more graphical objects for a first screen of said interface;

transmission means for transmitting a description of said compositing expression, to said second computer, together with object identifiers corresponding to graphical objects for said first screen;

reconstruction means for reconstructing said compositing expression based on said transmitted description and identifiers, wherein said transmitted identifiers are mapped to a description of each of said graphical objects stored within said second computer; and display means for displaying said first screen of said interface according to said reconstructed compositing expression.

According to still another aspect of the present invention there is provided an apparatus for generating an interface comprising a plurality of screens, on a first computer for display by a second computer, each of said screens comprising one or more graphical objects, wherein each of said graphical objects has an associated identifier, said apparatus comprising:

storing means for storing a first description of each of said graphical objects together with said associated identifiers, within said first computer;

constructing means for constructing a hierarchical compositing expression utilising one or more of said stored first descriptions, said hierarchical compositing expression representing an arrangement of graphical objects for a first screen of said interface;

transmitting means for transmitting a description of said compositing expression, to said second computer, together with object identifiers corresponding to graphical objects for said first screen;

reconstructing means for reconstructing said compositing expression based on said transmitted description and identifiers, wherein said transmitted identifiers are mapped to second descriptions of each of said graphical objects stored within said second computer; and display means for displaying said first screen of said interface according to said reconstructed compositing expression.

According to still another aspect of the present invention there is provided an apparatus for displaying an interface comprising a plurality of screens, on a first computer, said interface being generated by a second computer, said apparatus comprising:

constructing means for constructing a hierarchical compositing expression representing an arrangement of one or more graphical objects for a first screen of said interface;

transmitting means for transmitting a description of said compositing expression, to said first computer, together with object identifiers corresponding to graphical objects for said first screen;

reconstructing means for reconstructing said compositing expression based on said transmitted description and identifiers, wherein said transmitted identifiers are mapped to a description of each of said graphical objects stored within said first computer; and display means for displaying said first screen of said interface according to said reconstructed compositing expression.

According to still another aspect of the present invention there is provided a program for generating an interface comprising a plurality of screens, on a first computer for display by a second computer, said program comprising:

code for constructing a hierarchical compositing expression representing an arrangement of one or more graphical objects for a first screen of said interface;

code for transmitting a description of said compositing expression, to said second computer, together with object identifiers corresponding to graphical objects for said first screen;

code for reconstructing said compositing expression based on said transmitted description and identifiers, wherein said transmitted identifiers are mapped to a description of each of said graphical objects stored within said second computer; and code for displaying said first screen of said interface according to said reconstructed compositing expression.

According to still another aspect of the present invention there is provided a program for generating an interface, comprising a plurality of screens, on a first computer for display by a second computer, each of said screens comprising one or more graphical objects, wherein each of said graphical objects has an associated identifier, said program comprising:

code for storing a first description of each of said graphical objects together with said associated identifiers, within said first computer;

code for constructing a hierarchical compositing expression utilising one or more of said stored first descriptions, said hierarchical compositing expression representing an arrangement of graphical objects for a first screen of said interface;

code for transmitting a description of said compositing expression, to said second computer, together with object identifiers corresponding to graphical objects for said first screen;

code for reconstructing said compositing expression based on said transmitted description and identifiers, wherein said transmitted identifiers are mapped to second descriptions of each of said graphical objects stored within said second computer; and code for displaying said first screen said interface according to said reconstructed compositing expression.

According to still another aspect of the present invention there is provided a program for displaying an interface comprising a plurality of screens, on a first computer, said interface being generated by a second computer, said program comprising:

code for constructing a hierarchical compositing expression representing an arrangement of one or more graphical objects for a first screen of said interface;

code for transmitting a description of said compositing expression, to said first computer, together with object identifiers corresponding to graphical objects for said first screen;

code for reconstructing said compositing expression based on said transmitted description and identifiers, wherein said transmitted identifiers are mapped to a description of each of said graphical objects stored within said first computer; and code for displaying said first screen of said interface according to said reconstructed compositing expression.

Other aspects of the invention are also disclosed.

BRIEF DESCRIPTION OF THE DRAWINGS

One or more arrangements of the present invention will now be described with reference to the drawings, in which:

FIG. 6(a) shows a textual script graphical user interface description;

FIG. 6(b) shows a compositing tree structure according to the textual script description of FIG. 6(a);

FIG. 6(c) shows the result of rendering the compositing tree of FIG. 6(b);

DETAILED DESCRIPTION INCLUDING BEST MODE

Figure 1:
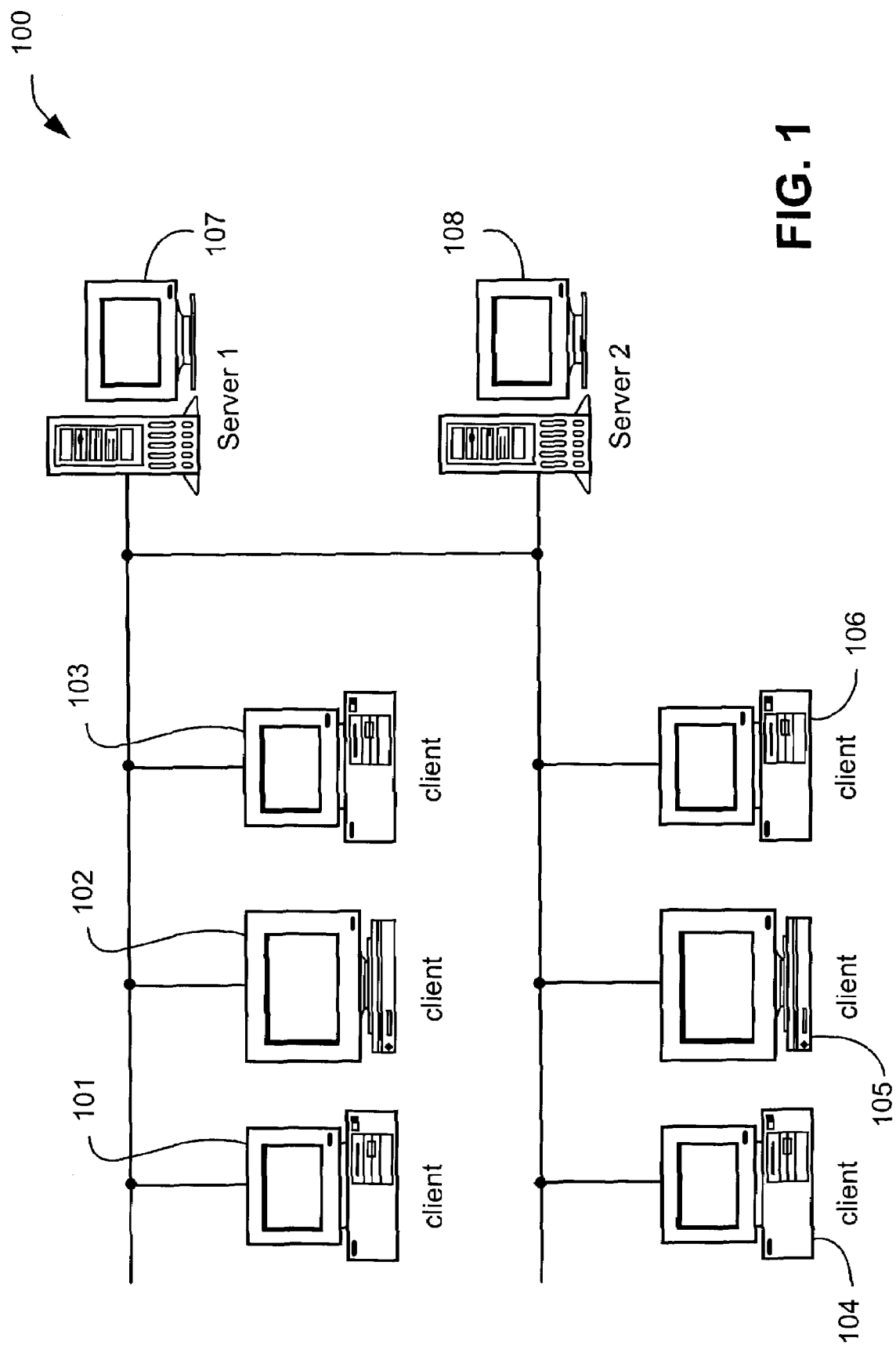
FIG. 1 is a schematic block diagram of a computer network upon which arrangements described herein can be practiced.

Where reference is made in any one or more of the accompanying drawings to steps and/or features, which have the same reference numerals, those steps and/or features have for the purposes of this description the same function(s) or operation(s), unless the contrary intention appears.

A method 1000, seen depicted in FIG. 10, of generating a graphical user interface is described below with reference to FIGS. 1 to 13. Referring to FIG. 1, the method 1000 permits a heterogenous collection of clients 101 to 106, for example, to each independently obtain and interact with a graphical user interface exported from a selected server 107 or 108, on a computer network 100. In the method 1000, a client (e.g. the client 102) selects a server (e.g. the server 107), establishes a communications channel between the client 102 and the server 107, and then proceeds to interact with the server 107. The method 1000 enables a server (e.g. the server 107) to update the display of the client (e.g. the client 102) in a fast, efficient manner, in order to provide animation features to the graphical interface at interactive display rates.

Figure 2:
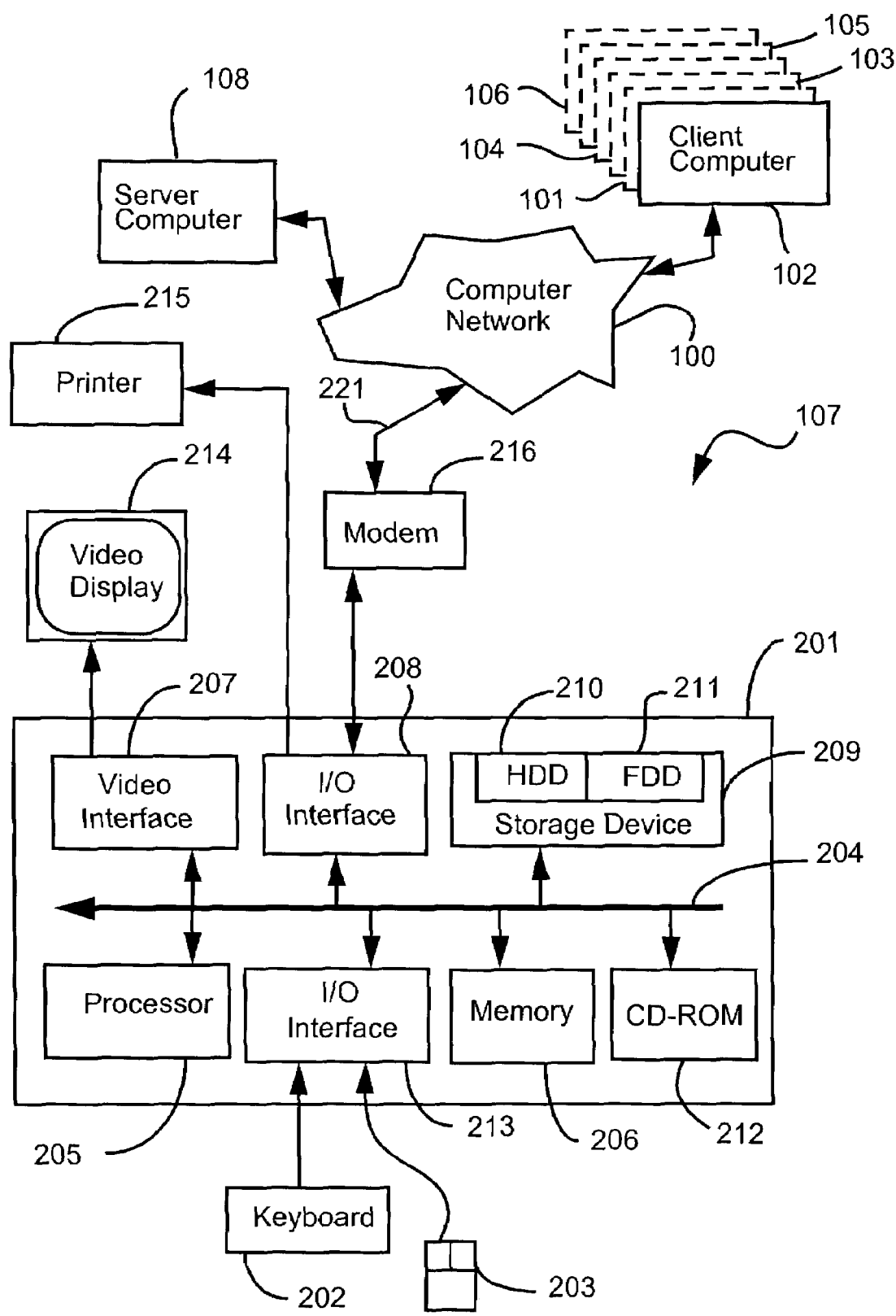
FIG. 2 is a schematic block diagram showing the configuration of the server computers of the computer network of FIG. 1.
Figure 3:
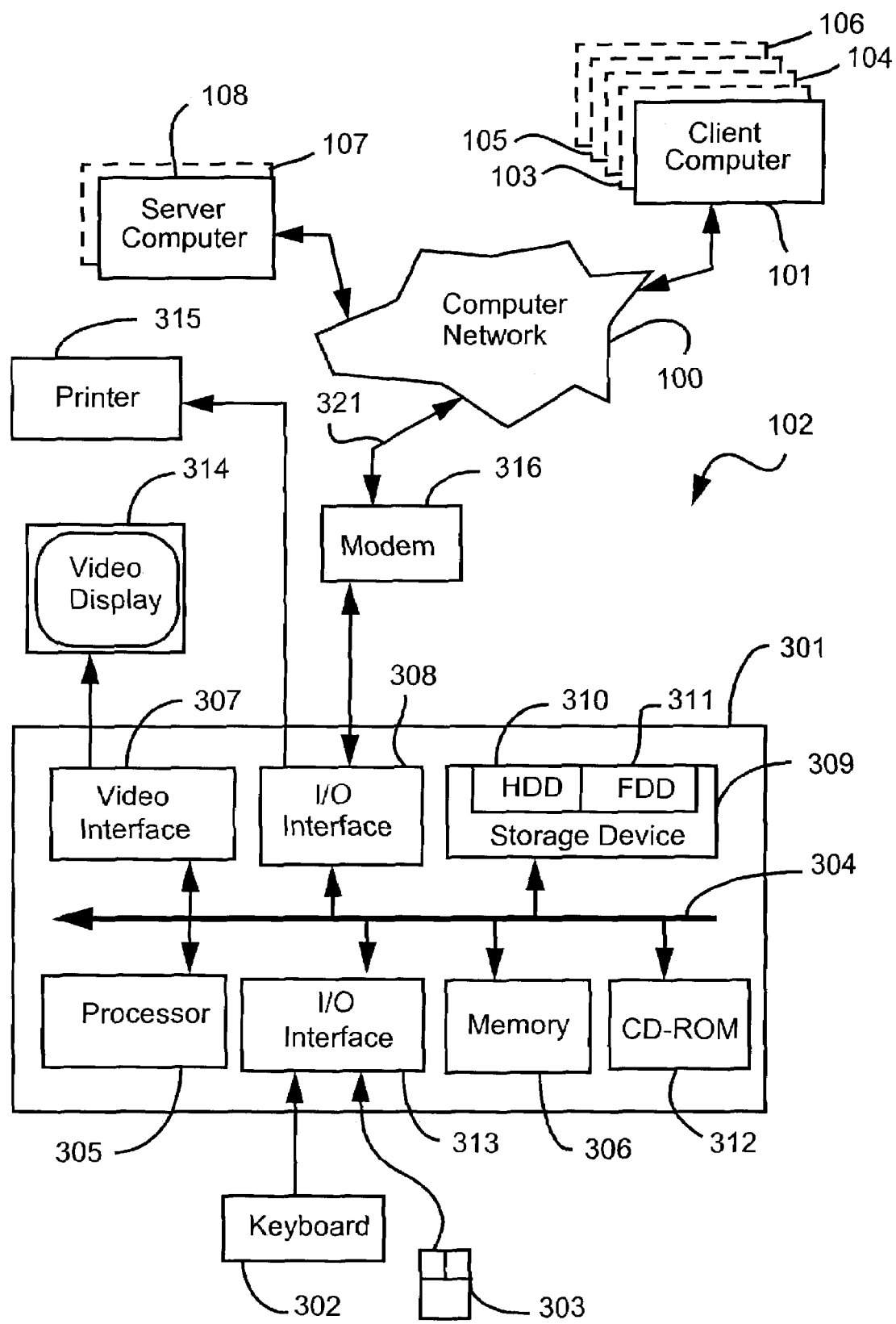
FIG. 3 is a schematic block diagram showing the configuration of the client computers of the computer network of FIG. 1.

The servers 107 and 108, and the clients 101 to 106 can be implemented as general-purpose computers, such as those shown in FIGS. 2 and 3, wherein the processes of the arrangements described herein may be implemented using software, such as an application program executing in conjunction with a host graphical user interface within the computer system 100. The clients 102 and 105 are shown as thin client computers (or thin clients), as known to those in the relevant art, meaning that the clients 102 and 105 typically have much less processing power than the clients 101, 103, 104 and 106.

The steps of the methods described herein are effected by instructions in the software that are carried out by one of the clients 101 to 106 or the server 107 or 108. The instructions may be formed as one or more code modules, each for performing one or more particular tasks. The software may also be divided into two separate parts, in which a first part performs the methods and a second part manages the host graphical user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for performing the methods.

As seen in FIG. 2, the server 107 comprises a computer module 201, input devices such as a keyboard 202 and mouse 203, output devices including a printer 215 and a display device 214. The server 108 has a similar configuration to the server 107. The display device 214 can be used to display screens (i.e. one or more visible graphical object components or text) of the host graphical user interface. A Modulator-Demodulator (Modem) transceiver device 216 is used by the computer module 201 for communicating to and from a communications network 220, for example, connectable via a telephone line 221 or other functional medium. The modem 216 can be used to obtain access to the computer network 100, and other network systems, such as the Internet, a Local Area Network (LAN) or a Wide Area Network (WAN).

The computer module 201 typically includes at least one processor unit 205, a memory unit 206, for example formed from semiconductor random access memory (RAM) and read only memory (ROM), input/output (I/O) interfaces including a video interface 207, and an I/O interface 213 for the keyboard 202 and mouse 203 and optionally a joystick (not illustrated), and an interface 208 for the modem 216. A storage device 209 is provided and typically includes a hard disk drive 210 and a floppy disk drive 211. A magnetic tape drive (not illustrated) may also be used. A CD-ROM drive 212 is typically provided as a non-volatile source of data. The components 205 to 213 of the computer module 201, typically communicate via an interconnected bus 204 and in a manner which results in a conventional mode of operation of the computer 107 known to those in the relevant art. Examples of computers on which the described arrangements can be practised include IBM-PC's and compatibles, Sun Sparcstations or alike computer systems evolved therefrom.

As seen in FIG. 3, the client 102 comprises a computer module 301, input devices such as a keyboard 302 and mouse 303, output devices including a printer 315 and a display device 314. The clients 101, 103, 104, 105 and 106 have a similar configuration to the client 102. The display device 314 can be used to display screens (i.e. one or more visible graphical object components or text) of the host graphical user interface. A Modulator-Demodulator (Modem) transceiver device 316 is used by the computer module 301 for communicating to and from a communications network 320, for example connectable via a telephone line 321 or other functional medium. The modem 316 can be used to obtain access to the computer network 100, and other network systems, such as the Internet, a Local Area Network (LAN) or a Wide Area Network (WAN).

The computer module 301 includes at least one processor unit 305, a memory unit 306, for example formed from semiconductor random access memory (RAM) and read only memory (ROM), input/output (I/O) interfaces including a video interface 307, and an I/O interface 313 for the keyboard 302 and mouse 303 and optionally a joystick (not illustrated), and an interface 308 for the modem 316. A storage device 309 is provided and typically includes a hard disk drive 310 and a floppy disk drive 311. A magnetic tape drive (not illustrated) may also be used. A CD-ROM drive 312 is typically provided as a non-volatile source of data. The components 305 to 313 of the computer module 301, typically communicate via an interconnected bus 304 and in a manner which results in a conventional mode of operation of the computer 102 known to those in the relevant art.

Figure 4:
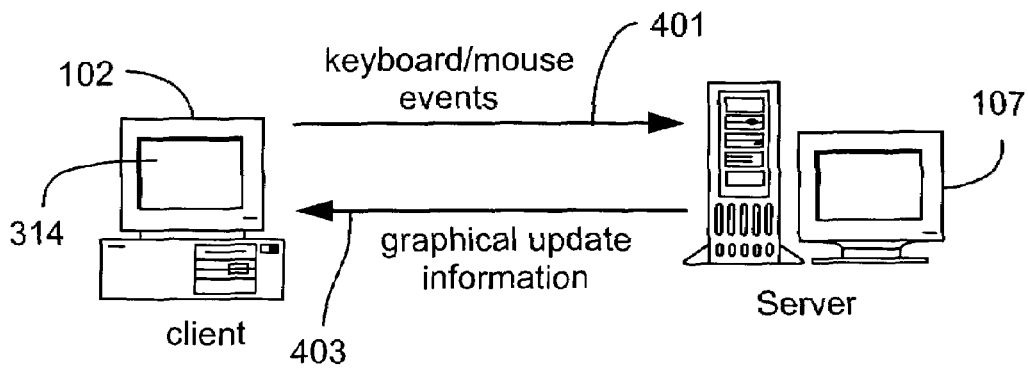
FIG. 4 shows a typical interaction scenario between a client and a server of the computer network of FIG. 1.

FIG. 4 shows an example interaction sequence between a client (e.g. the client 102) and a server (e.g. the server 107) of the network 100. As represented by the arrow 401, the processor 305 of the client 102 issues user events to the server 107; and, as represented by the arrow 403, the processor 205 of the server 107 responds to such events by sending graphical updates to the client 102. The client 102 in turn presents graphical updates on the display 314 and awaits further user-generated events or graphical updates from the server 107. Such an arrangement gives the server 107 complete control over what is displayed on the display 314 of the client 102 at any given point in time.

Figure 5:
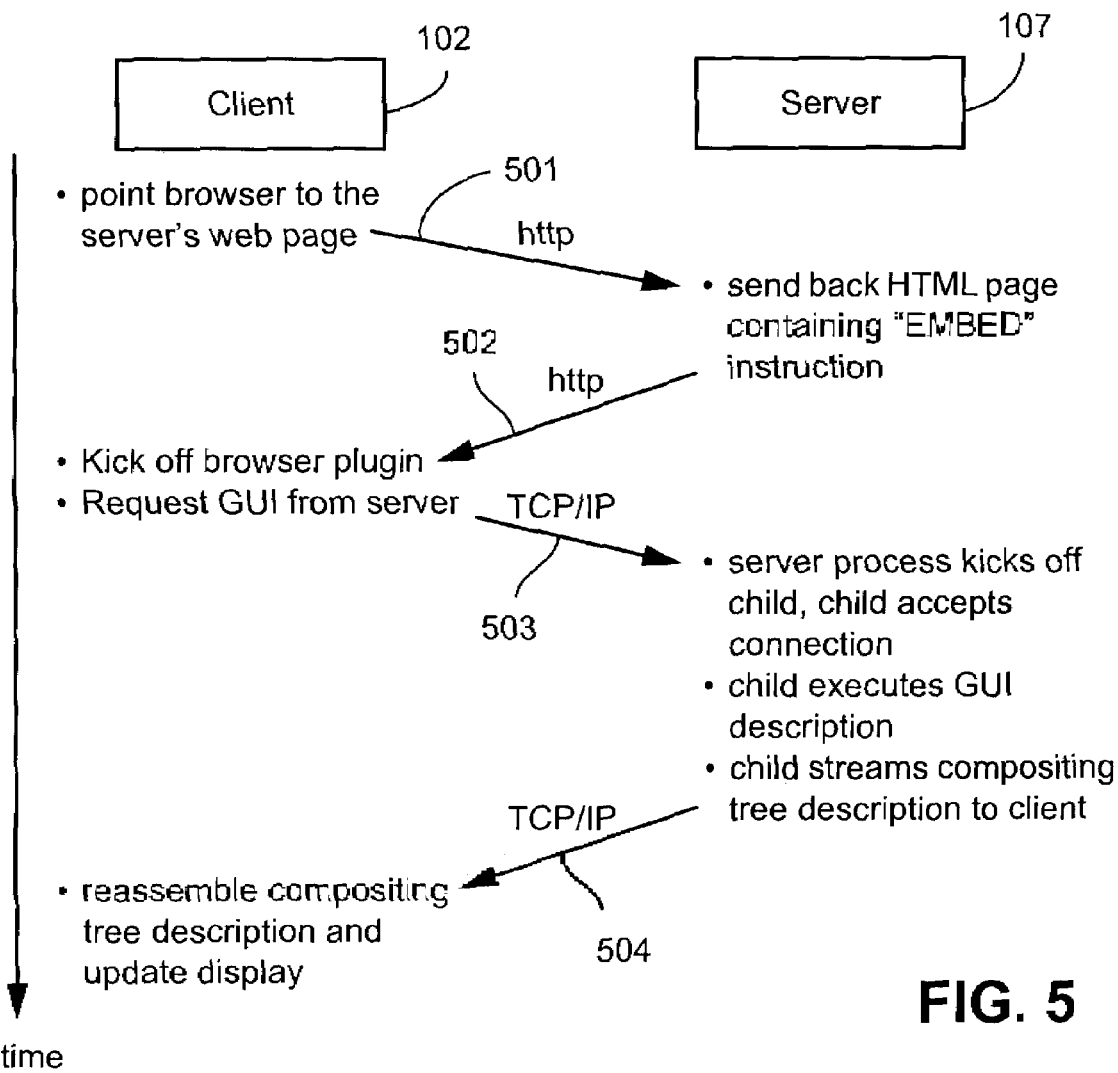
FIG. 5 is a sequence diagram showing the process of establishing a communications channel between a client and a server of FIG. 1.

FIG. 5 is a sequence diagram showing the sequence of events in establishing a communications channel between the client 102 and the server 107. The communications channel is established over the telephone line 221, for example. In this connection, the method 1100 performed by the client 102, for establishing a communications channel with the server 107 will be explained below with reference to FIG. 11. The method 1100 is preferably implemented as part of a browser software application program. Typically, the browser software application program is resident on the hard disk drive 310, the software being read and controlled in its execution by the processor 305. Intermediate storage of the browser software application program and any data fetched from the network 100 may be accomplished using the semiconductor memory 306, possibly in concert with the hard disk drive 310. In some instances, the browser software application program may be supplied to the user encoded on a CD-ROM or floppy disk and read via the corresponding drive 312 or 311, or alternatively may be read by the user from the network 100 via the modem device 316. Still further, the browser software application program can also be loaded into the computer 102 from other computer readable media. The term "computer readable medium" as used herein refers to any storage medium that participates in providing instructions and/or data to the computer 102 for execution and/or processing. Examples of such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. The browser software application program drives the display 314 of the client 102.

In addition, the method 1200 performed by the server 107 for establishing a communications channel with the client 102, will be explained below with reference to FIG. 12. The method 1200 is preferably implemented as a software application program. Similar to the browser software application program executing on the client 102, the server application program is resident on the hard disk drive 210 of the server 102, the software being read and controlled in its execution by the processor 205. Intermediate storage of the program and any data fetched from the network 100 may be accomplished using the semiconductor memory 206, possibly in concert with the hard disk drive 210. Again, in some instances, the server application program may be supplied to the user encoded on a CD-ROM or floppy disk and read via the corresponding drive 212 or 211, or alternatively may be read by the user from the network 220 via the modem device 216. Still further, the software can also be loaded into the computer 107 from other computer readable media.

Again referring to FIG. 5, the client 102 initiates the establishment of a communications channel between the client 102 and the server 107. As represented by the arrow 501, the browser software application program, executing within the computer 102, is instructed (e.g. through user input on the keyboard 314) to fetch a Hypertext Transport Protocol (HTTP) address present on the server 107. Then, as represented by the arrow 502, the HTTP protocol request results in a Hypertext Mark-up Language (HTML) description on the server 107 being streamed to the client 102. The browser software application program then interprets the obtained HTML description. The HTML description contains an instruction, which instructs the browser to start up browser plug-in software specified by the instruction. The plug-in software must be previously installed on the client 102. If the plug-in software is not installed on the client 102, then the user must be prompted by the processor 305 to take the necessary action to install the plug-in software, and to then reattempt the establishment of the communications channel. The HTML instruction also specifies further parameters to the client 102, including the name of a graphical interface associated with the specified HTTP address, and a Transmission Control Protocol/Internet Protocol™ (TCP/IP) socket that the server 107 is connected to.

The browser plug-in software of the client 102, having been executed, uses the parameters supplied by the HTML instruction to connect to the specified socket of the server 107, and requests the graphical user interface specified by the name parameter in the instruction, as represented by the arrow 503. The processor 305 of the client 102 supplies further parameters as part of the request, including window dimensions at which the graphical user interface is to be presented on the display 314.

The processor 205 of the server 106 receives the request from the client 102, and spawns a child process to deal with the request. Further, communications from the client 102 are then directed to the child process. After having created the child process, the server 107 continues to listen for new client requests from graphical user interfaces. The child process, then executes a script containing a graphical description for the user interface. The script describes a compositing tree consisting of the graphical objects to be displayed and instructions of how the graphical objects are to be arranged on the display 314, taking into consideration the window dimension parameters specified by the client request. After constructing the compositing tree as per the script, the processor 205 then streams a description of the compositing tree to the client 102, as represented by the arrow 504. The description is then used by the client 102 to reassemble the compositing tree description and update the display 314.

Figure 11:
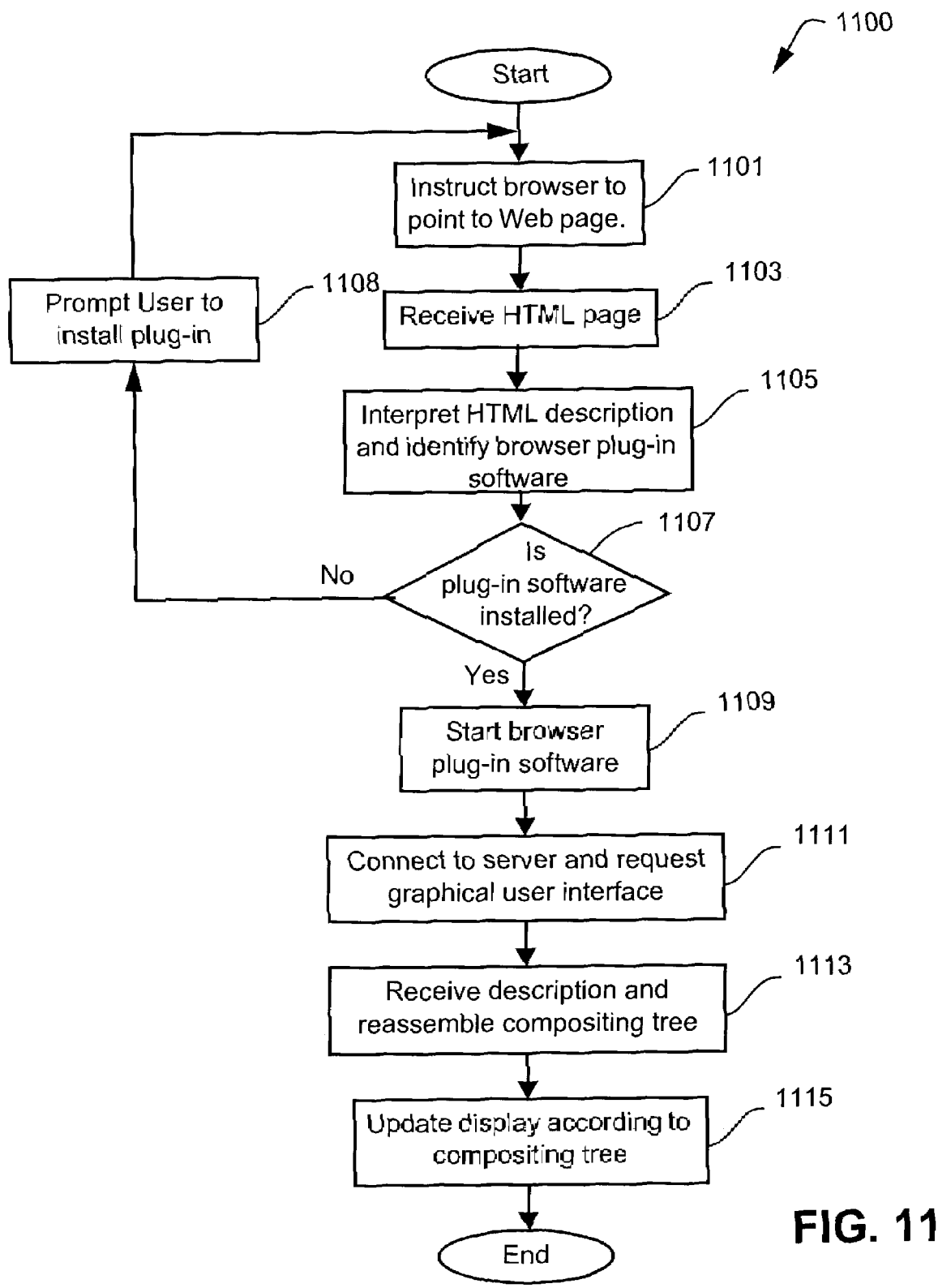
FIG. 11 is a flow diagram showing a method of establishing a communications channel with the server, as performed by the client of FIG. 4.

Referring to FIG. 11, the method 1100 begins at step 1101, where the processor 305 of the client 102 transmits an instruction to the server 107, in order to fetch a Hypertext Transport Protocol (HTTP) address stored on the hard disk drive 210 of the server 107. At the next step 1103, the processor 305 receives a Hypertext Mark-up Language (HTML) description from the server 107. The method 1100 continues at the next step 1105, where the processor 305 interprets the HTML description and identifies browser plug-in software specified by the instruction contained within the HTML description. If the specified plug-in software is not installed on the client 102, at the next step 1107, then the processor 305 prompts the user to take the necessary action to install the plug-in software, at the next step 1108, and the method 1100 returns to step 1101. Once the user has installed the plug-in software the user can then reattempt the establishment of the communications channel. If the specified plug-in software is installed on the client 102, at step 1107, the method 1100 proceeds to step 1109, where the processor 305 starts the browser plug-in software. At the next step 1111, the browser plug-in uses the parameters supplied by the HTML instruction to connect to the specified socket of the server 107, and requests the graphical user interface specified by the name parameter in the HTML instruction.

The method 1100 continues at the next step 1113, where the processor 305 receives the description of the compositing tree from the server 107 and reassembles the compositing tree. The method 1100 concludes at the next step 1115, where the display 314 is updated, by the processor 305, according to the compositing tree.

Figure 12:
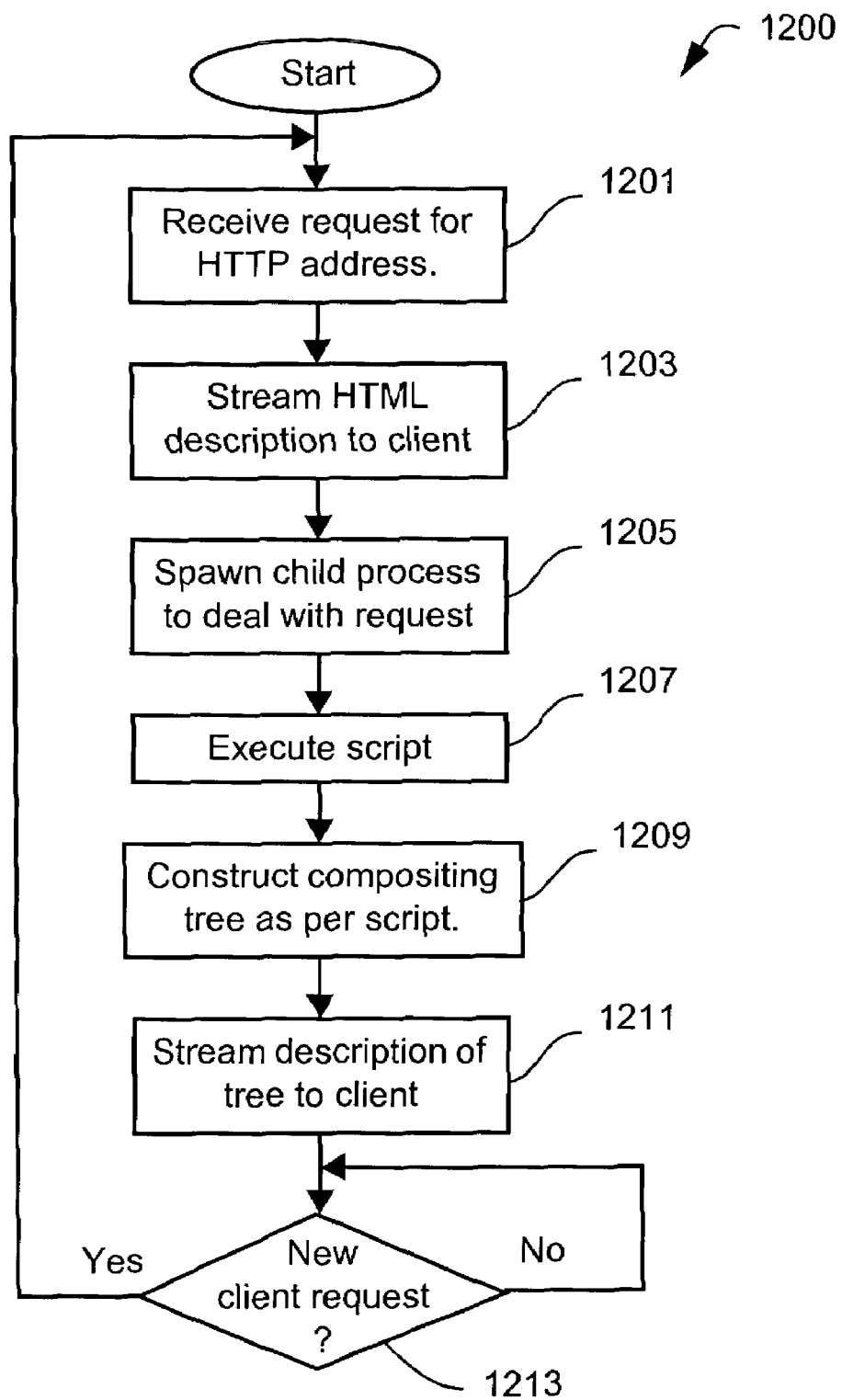
FIG. 12 is a flow diagram showing a method of establishing a communications channel with the client, as performed by the server of FIG. 4.
Figure 13:
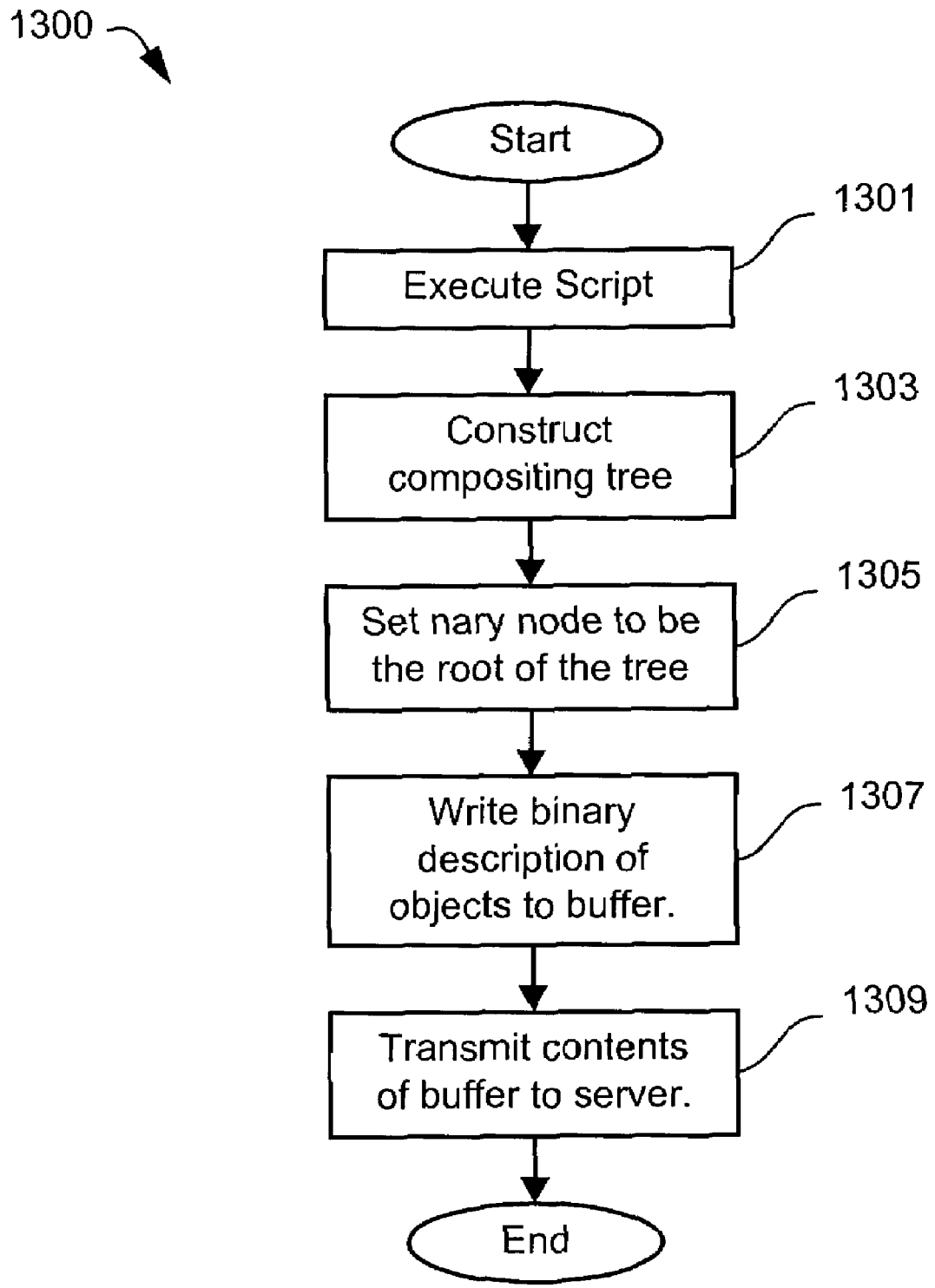
FIG. 13 is a flow diagram showing a method of interpreting the script of FIG. 6(a) and constructing the compositing tree structure of FIG. 6(b).

Referring to FIG. 12, the method 1200 begins step 1201 where the processor 205 receives the instruction from the client 102 requesting the HTTP address stored on the hard disk drive 210 of the server 107. At the next step 1203, the processor 205 streams the HTML description to the client 102. The method 1200 continues at the next step 1205, where the processor 205 receives the request for the graphical user interface, from the client 102, and spawns a child process to deal with the request. As described above, the requests sent from the client 102 includes parameters such as the window dimensions at which the graphical user interface is to be presented on the display 314. At next step 1207, the processor 205 executes the script containing the graphical description of the user interface. The processor 205 then constructs the compositing tree as per the script, at the next step 1209, taking into consideration the window dimension parameters specified by the client request. After constructing the compositing tree as per the script, the processor 205 then streams a description of the compositing tree to the client 102, at the next step 1211. The processor 205 then continues to listen for new client requests from graphical user interfaces, at the next step 1213, and upon reception of a new client request, returns to step 1201.

The method 1300 of interpreting the script and constructing the compositing tree structure 603, as performed by the processor 205 at steps 1207 and 1209, will now be explained in further detail with reference to FIGS. 6(a), 6(b), 6(c) and FIG. 13. The method 1300 is preferably implemented as part of the server software application program being stored on the hard disk drive 210 and being executed by the processor 205. FIG. 6(a) shows a textual script description 601, which is interpreted by the processor 205 of the server 107, in order for the processor 205 to construct a corresponding compositing tree structure 603 as shown in FIG. 6(b). The structure 603 is rendered on the display 314 of the client 102, as shown in FIG. 6(c). The method 1300 begins at step 1301, where the script 601 is executed by the processor 205 of the server 107 to create graphical primitives 605, 607 and 609. In the example of FIGS. 6(a), 6(b) and 6(c), a circle 605, a rectangle 609 and an n-nary node 607 (hereinafter "nary") are created. At the next step 1303, the structure of the compositing tree 603 is constructed, by the processor 205, by attaching the circle 605 and the rectangle 609 to specified slots in the nary node 607. Then at the next step 1305, the nary node 607 is set to be the root of the compositing tree 603, resulting in the structure 603 as shown in FIG. 6(b).

Figure 7:
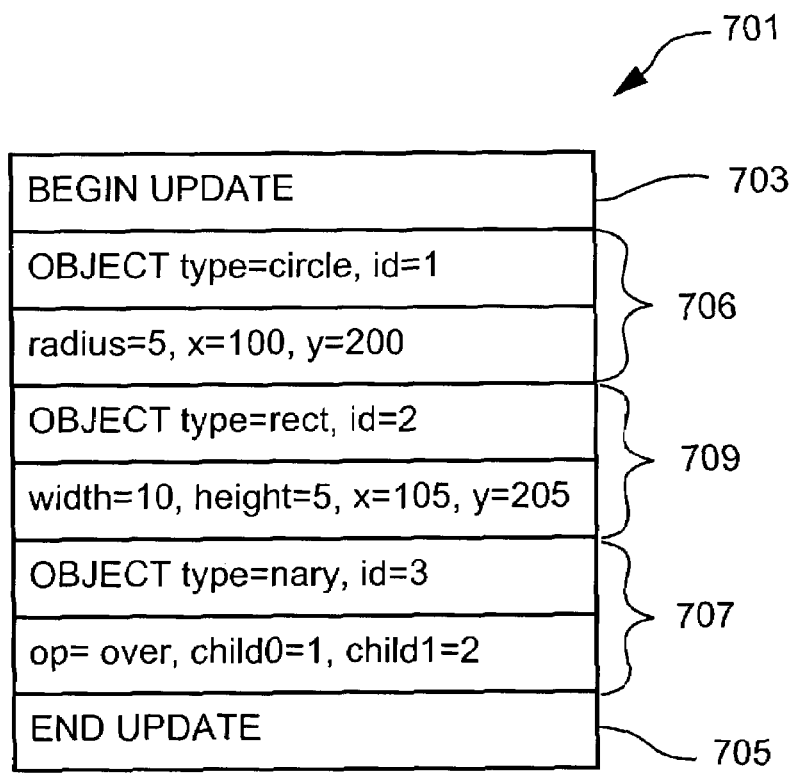
FIG. 7 shows a buffer containing binary descriptions for the compositing tree of FIG. 6(b)

The method 1300 continues at the next step 1307, where having constructed the compositing tree structure 603 to be displayed, the processor 205 writes a binary description corresponding to each of the graphical object 605, 607 and 609 to a buffer 701 as shown in FIG. 7. The buffer 701 will be explained in more detail below. The method 1300 concludes at the next step 1309, where the contents of the buffer 701 are transmitted by the processor 205 of the server 107 to the client 102 for display on the display 314.

Referring to FIG. 7, the buffer 701 begins with binary code representing a BEGIN_UPDATE instruction 703, and is completed with the binary code for an END_UPDATE instruction 705. Specifications 706, 709 and 707 for the objects 605, 609 and 607, respectively, are also contained in the buffer 701 between the instructions 703 and 705. A unique object identifier is assigned by the server 107 to each created graphical object 605, 607 and 609. In the example of FIG. 7, the circle 605 has been assigned the identifier "1" (i.e. id=1) as shown by the specification 706. The rectangle 609 is assigned the identifier "2", and the nary node graphical object 607 has been assigned the identifier "3". Each of the specifications 706, 709 and 707 for the graphical objects 605, 607 and 609, includes a description of how the corresponding graphical object should be drawn, together with the attributes for the graphical objects. As seen in FIG. 7, both the specifications 706 and 709 for the circle 605 and the rectangle 609, respectively, have an "x" and a "y" attribute, indicating the positions of the graphical objects 605 and 609 on the display 314.

As described above, upon receiving the contents of the buffer 701 from the processor 205 of the server 107, the processor 305 of the client 102 executes the client plug-in software. The client plug-in software is configured to construct structures according to a rendering library, configured within the memory (e.g. the memory 306) of the client 102, in preparation for rendering the graphical objects 605 and 609 on the display 314.

Figure 8:
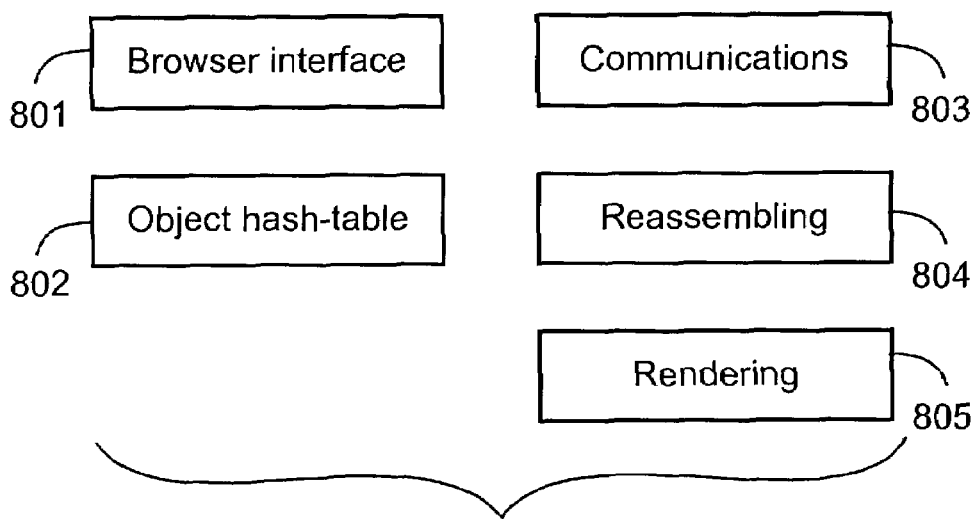
FIG. 8 shows software components in the structure of client plug-in software executed by a processor of the client of FIG. 4.

FIG. 8 shows the preferred software components 801, 802, 803, 804 and 805 of the client plug-in software, executed by the processor 305 of the client 102. The client plug-in software preferably comprises a browser interface component 801 responsible for interacting with a browser-dependent interface. A communications component 803 is responsible for sending and receiving data to and from the server 107. An object hash table 802 retains a mapping of object identifiers, as provided by the server 107 with each graphical object, to a relevant graphical object in a rendering library stored within the memory 306 of the client 102. A reassembling component 804 obtains graphical object data from the communications component 803 as sent by the server 107, and constructs an appropriate structure that is understood by the rendering library. A reassembling component 804 utilises the hash table component 802 to identify graphical objects which already exist, and hence only require object attributes to be modified. The rendering library 805 stored within the memory 306 of the client 102 accepts newly created and modified graphical objects, and renders the objects to a display area allocated by the browser software application program and configured within memory (e.g. RAM) of the client 102. To ensure fast responsiveness back to a user of the client 102, the rendering library configured in memory 306 of the client 102 must be able to handle incremental changes to the state of graphical objects.

In transmitting graphical object based incremental information from the server 107, a smaller amount of bandwidth than would otherwise be required if pixel information was transmitted, results in faster response time to a user. Transmission of pixel data typically also requires compression in order to meet practical bandwidth requirements, again significantly reducing the response time to the user.

Figure 9:
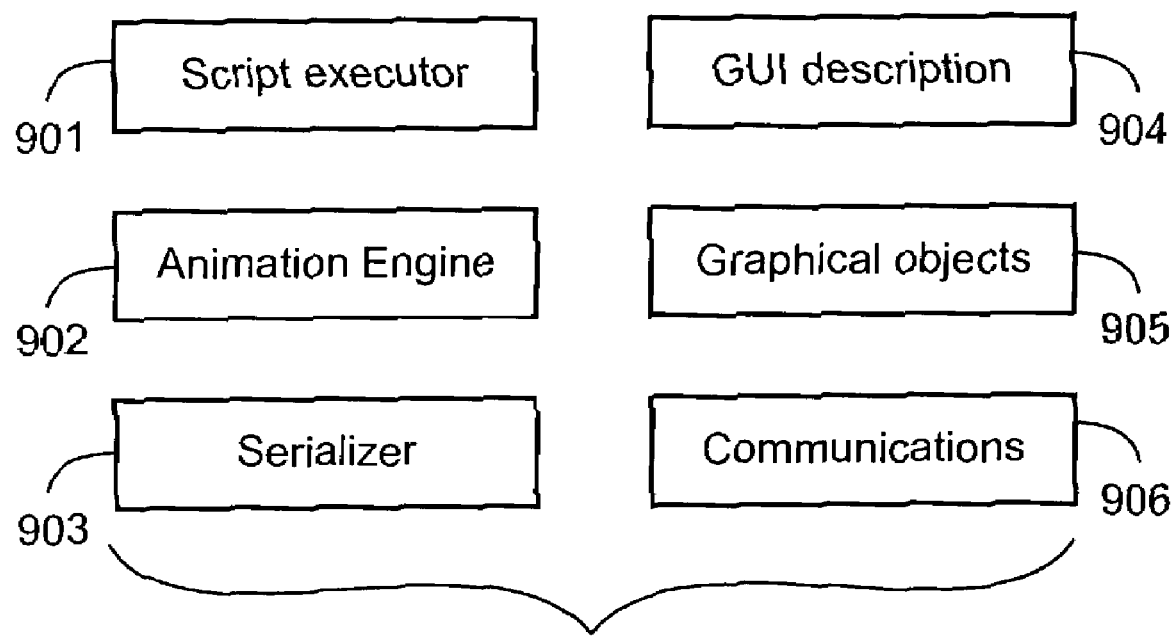
FIG. 9 shows software components in the structure of software executed by a processor of the server of FIG. 4.
Figure 10:
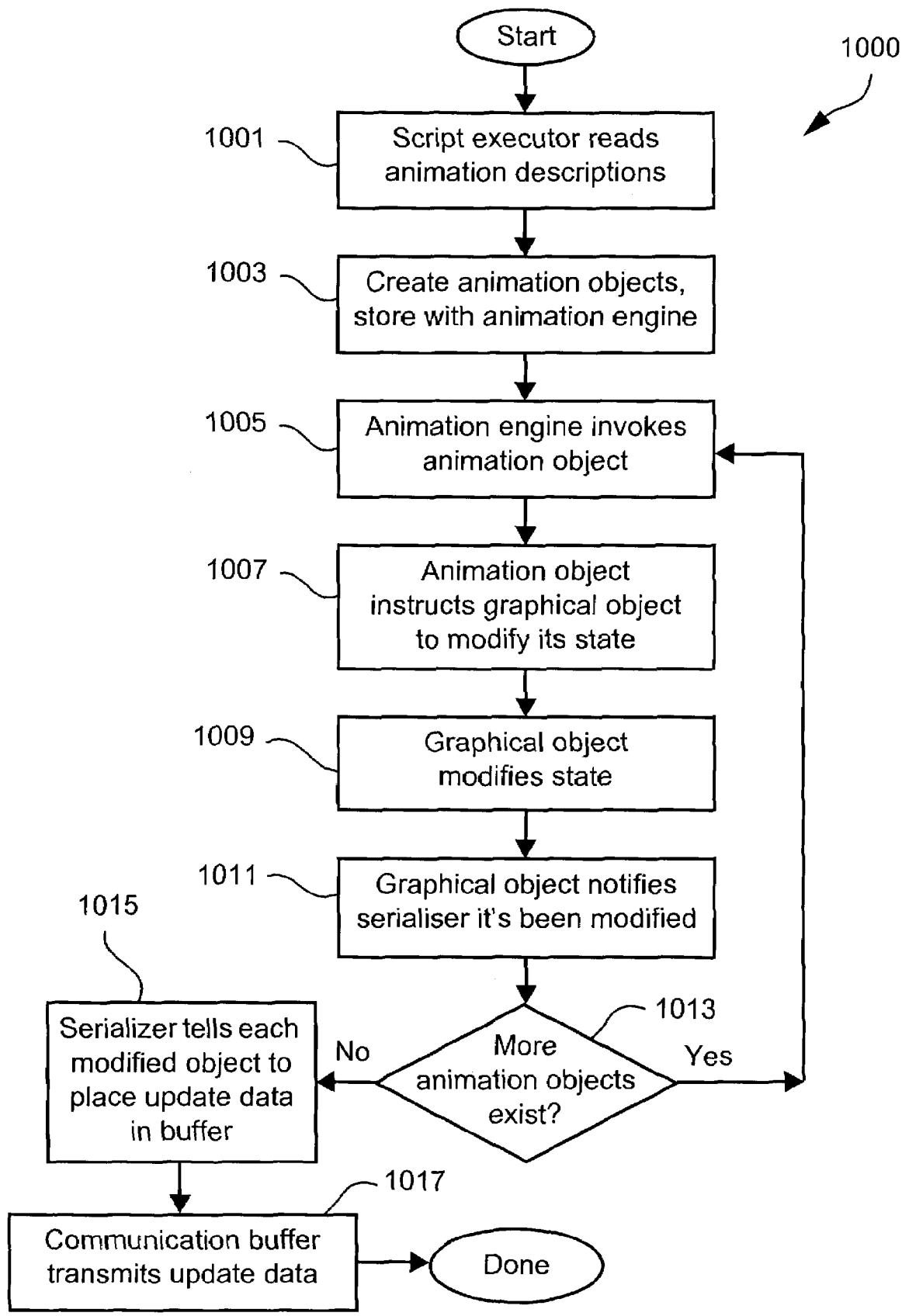
FIG. 10 is a flow diagram showing a method of generating a graphical user interface on a remote server.

FIG. 9 shows the preferred software components 901 to 906 in implementing the method 1000 to be described below. A communications component 906 is responsible for the interaction with the client processor 305. A serializer component 903 is responsible for detecting which graphical objects (e.g. the graphical objects 605, 607 and 609) have changed at any point in time, and updating the object specifications 706, 707 and 709 in the buffer 701, which is transmitted to the client 102. The server 107 contains a list 905 of the created graphical objects 605, 607 and 609, each with their own unique identifiers. These objects 605, 607 and 609 contain individual state information, as well as organisation information for the compositing tree 603. The objects 605, 607 and 609 are created and modified through a graphical user interface (GUI) description script 904 (e.g. the script 601) which presents both the graphical description and code to handle user interaction events generated by the client 102 as well as timer events. The script is executed by a script executor component 901. Finally, an animation manager (or engine) component 902 is responsible for the execution of animation objects (not shown) described in the graphical user interface description script. Execution of these animation objects results in modification to the state of existing graphical objects (e.g. the objects 605, 607 and 609).

The method 1000 of generating a graphical user interface, will now be explained in more detail with reference to FIG.

10. The method 1000 is preferably implemented using software resident on the hard disk drive 210 of the server 107, the software being read and controlled in its execution by the processor unit 205 of the server 107. The method 1000 results in continuous updates of the client display (e.g. the display 314). The method 1000 will be explained with reference to the example of FIG. 6. The method 1000 begins at the first step 1001, where each animation object corresponding to objects 605, 607 and 609 defined by the script 601, is interpreted by the script executor 901 being executed by the processor 205. At the next step 1003, each of the animation objects corresponding to the graphical objects 605, 607 and 609, is stored within the animation manager 902 configured within memory 206. The method 1000 continues at the next step 1005, corresponding to the execution of each frame, where the animation manager 902 invokes each animation object. At the next step 1007, the processor 205 invokes each of the animation objects to instruct the corresponding graphical objects 605, 607 and 609 to modify their state. The method 1000 continues at the next step 1009, where the state of each of the graphical objects 605, 607 and 609 is modified depending on the instructions received from the corresponding animation object. At the next step 1011, each modified graphical object sends notification to the serializer component 903. If all animation objects have been processed, at step 1013, then the method 1000 proceeds to step 1015. Otherwise the method 1000 returns to step 1005. At the next step 1015, the serializer component 903 instructs each modified object to place a binary description of all corresponding modified attributes within a given buffer (e.g. the buffer 701) configured within memory 206 of the server 107. The method 1000 concludes at the next step 1017, where the contents of the buffer containing details of the modified attributes is transmitted to the client 102, resulting in the update of the display 314.

Script defined graphical user interfaces can be triggered in a number of ways, including a user event being reported by the client 102, the passing of a specified amount of time, or the termination of a previously triggered user interface. An animation object is created with the properties specified in the description of the script (e.g. the script 601). In addition to specifying a graphical object to be animated, a relevant attribute, starting and ending values and interpolation type, the properties in the script can also include the frame (display) rate at which to execute a corresponding animation, and the terminating condition for the animation. The terminating conditions available for an animation include run once, run once and call a scripted routine when complete, or loop continuously.

In the arrangements described above, user generated mouse interaction events are responded to using a technique known as hit testing. In the hit testing method, mouse interaction events are responded to by finding a top most graphical object currently being displayed on the client display 314 and having dimensions which overlap with present coordinates of a mouse pointer (e.g. the mouse 303) on the client display 314.

Two types of software configurations are described below for responding to user interaction with a pointing device such as the mouse 303. Referring to FIG. 8, the first configuration comprises software components 801, 802, 803, 804 and 805, with an added hit testing component (not shown), which would preferably be supplied by the rendering library configured within the memory of the client 102. In this case, the processor 305 of the client 102 interrogates a compositing tree (e.g. the compositing tree 603) in response to mouse events in order to determine which of the graphical objects 605, 607 and/or 609 have been manipulated by a user through the use of the mouse 303. The event is communicated to the server 107 together with the identifier for the affected object (e.g. Id=1). Responding to user interactions in this manner reduces bandwidth requirements for communicating mouse events, since mouse movements only need to be communicated when such a movement results in a corresponding mouse pointer moving above a different graphical object than the one the mouse pointer was above previously. However, one disadvantage is that additional processing power is required on behalf of the client 102, as well as additional software for hit testing detection.

The second software configuration described herein for responding to user interaction events with a pointing device comprises the components 901 to 906 of FIG. 9, with an added hit testing component. In the second configuration, the client 102 communicates all mouse related user events to the server 107 and the server 107 uses a hit testing component to determine which graphical object has been affected, before taking appropriate action. Such action typically involves determining an appropriate handler for the mouse event, and invoking an associated event handler object to handle the event. The event handler is often a routine written within the graphical description script. The second software configuration reduces the computation power required by the client 102, but increases the specification on the required bandwidth of client 102 to server 107 communications.

The arrangements described above with reference to FIGS. 1 to 13 provide the advantage that a thin client can be constructed with the ability to display visual effects which would otherwise require both significant software and processing power on the part of the client (e.g. 102). The described arrangements also permit the client 102 to use standard web browser software for interacting with information presented on the graphical display 314, but at the same time giving the server 107 complete control over the generation of a graphical interface to be displayed. In addition, the server 107 is able to update the display of the client 102 in a fast, efficient manner, providing compelling animation features to the graphical interface at interactive rates.

In addition, the arrangements described above provide the added advantage to a designer of a graphical user interface, in that the client 102/server 107 interaction is abstracted from the description of the graphical interface. The described arrangements also handle all necessary communications, not only making the designer's initial task simpler, but also allowing modifications to an existing description of a graphical user interface much easier.

The described arrangements can alternatively be implemented in dedicated hardware such as one or more integrated circuits performing the functions or sub functions of FIGS. 10, 11, 12 and 13. Such dedicated hardware may include graphic processors, digital signal processors, or one or more microprocessors and associated memories.

The aforementioned described methods comprise a particular control flow. There are many other variants of the described methods which use different control flows without departing the spirit or scope of the invention. Furthermore one or more of the steps of the described methods may be performed in parallel rather sequentially.

The foregoing describes only some arrangements of the present invention, and modifications and/or changes can be made thereto without departing from the scope and spirit of the invention, the arrangements being illustrative and not restrictive.

The claims defining the invention are as follows:

1. A method of generating an interface comprising a plurality of screens, on a first computer for display by a second computer, said method comprising the steps of:
   (i) constructing a compositing tree comprising one or more graphical objects and one or more compositing operations for compositing the graphical objects for a first screen of the interface;
   (ii) transmitting a description of the compositing tree, to the second computer, together with object identifiers corresponding to the graphical objects for the first screen;
   (iii) reconstructing the compositing tree based on the transmitted description and identifiers, wherein the transmitted identifiers are mapped to a description of each of the graphical objects stored within the second computer;
   (iv) displaying the first screen of the interface according to the reconstructed compositing tree; and
   (v) transmitting an event generated by the second computer to the first computer;
   (vi) modifying any of the graphical objects affected by the event, wherein the graphical objects affected by the event are animation objects;
   (vii) updating the compositing tree based on the modified graphical objects; and
   (viii) repeating at least steps (ii) to (iv) for at least one subsequent screen of the interface.

2. A method according to claim 1, wherein step (i) comprises the sub-step of storing a description of each of the graphical objects together with the associated identifiers, within the first computer.

3. A method according to claim 1, wherein step (i) comprises the sub-step of storing the description of the constructed compositing tree in a buffer configured within the first computer.

4. A method according to claim 1, further comprising the steps of:
   (ix) updating descriptions of the modified graphical objects corresponding to the affected animation objects; and
   (x) forwarding the updated descriptions to the second computer for storage and display.

5. A method of generating an interface, comprising a plurality of screens, on a first computer for display by a second computer, each of the screens comprising one or more graphical objects, wherein each of the graphical objects has an associated identifier, said method comprising the steps of:
   (i) storing a first description of each of the graphical objects together with the associated identifiers, within the first computer;
   (ii) constructing a compositing tree utilizing one or more of the stored first descriptions, the compositing tree comprising graphical objects and one or more compositing operations for compositing the graphical objects for a first screen of the interface;
   (iii) transmitting a description of the compositing tree, to the second computer, together with object identifiers corresponding to the graphical objects for the first screen;
   (iv) reconstructing the compositing tree based on the transmitted description and identifiers, wherein the transmitted identifiers are mapped to second descriptions of each of the graphical objects stored within the second computer;
   (v) displaying the first screen of the interface according to the reconstructed compositing tree; and
   (vi) transmitting an event generated by the second computer to the first computer;
   (vii) modifying any of the graphical objects affected by the event, therein the graphical objects affected by the event are animation objects;
   (viii) updating the compositing tree based on the modified graphical objects; and
   (ix) repeating at least steps (iii) to (v) for at least one subsequent frame of the interface.

6. A method according to claim 5, further comprising the step of storing the description of the constructed compositing tree in a buffer configured within the first computer.

7. A method of displaying an interface comprising a plurality of screens, on a first computer, the interface being generated by a second computer, said method comprising the steps of:
   (i) constructing a compositing tree comprising one or more graphical objects and one or more compositing operations for compositing the graphical objects for a first screen of the interface;
   (ii) transmitting a description of the compositing tree, to the first computer, together with object identifiers corresponding to the graphical objects for the first screen;
   (iii) reconstructing the compositing tree based on the transmitted description and identifiers, wherein the transmitted identifiers are mapped to a description of each of the graphical objects stored within the first computer;
   (iv) displaying the first screen of the interface according to the reconstructed compositing tree; and
   (v) transmitting an event generated in the first computer to the second computer;
   (vi) modifying any of the graphical objects affected by the event, wherein the graphical objects affected by the event are animation objects;
   (vii) updating the compositing tree based on the modified graphical objects; and
   (viii) repeating at least steps (ii) to (iv) for at least one subsequent screen of the interface.

8. A method according to claim 7, wherein step (i) comprises the sub-step of storing a description of each of the graphical objects together with the associated identifiers, within the second computer.

9. A method according to claim 7, wherein step (i) comprises the sub-step of storing the description of the constructed compositing tree in a buffer configured within the second computer.

10. An apparatus for generating an interface comprising a plurality of screens, on a first computer for display by a second computer, said apparatus comprising:
   construction means for constructing a compositing tree comprising one or more graphical objects and one or more compositing operations for compositing the graphical objects for a first screen of the interface;
   transmission means for transmitting a description of the compositing tree, to the second computer, together with object identifiers corresponding to the graphical objects for the first screen;
   reconstruction means for reconstructing the compositing tree based on the transmitted description and identifiers, wherein the transmitted identifiers are mapped to a description of each of the graphical objects stored within the second computer;
   display means for displaying the first screen of the interface according to the reconstructed compositing tree;
   further transmission means for transmitting an event generated by the second computer to the first computer;
   modifying means for modifying any of the graphical objects affected by the event, wherein the graphical objects affected by the event are animation objects; and updating means for updating the compositing tree based on the modified graphical objects in order to display at least one subsequent screen of the interface.

11. An apparatus according to claim 10, further comprising storage means for storing a description of each of the graphical objects together with the associated identifiers, within the first computer.

12. An apparatus according to claim 10, further comprising a buffer means for storing the description of the constructed compositing tree within the first computer.

13. An apparatus according to claim 10, further comprising:
    updating means for updating descriptions of the modified graphical objects corresponding to the affected animation objects; and
    forwarding means for forwarding the updated descriptions to the second computer for storage and display.

14. An apparatus for generating an interface comprising a plurality of screens, on a first computer for display by a second computer, each of the screens comprising one or more graphical objects, wherein each of the graphical objects has an associated identifier, said apparatus comprising:
    storing means for storing a first description of each of the graphical objects together with the associated identifiers, within the first computer;
    constructing means for constructing a compositing tree utilising one or more of the stored first descriptions, the compositing tree comprising one or more graphical objects and one or more compositing operations for compositing the graphical objects for a first screen of the interface;
    transmitting means for transmitting a description of the compositing tree, to the second computer, together with object identifiers corresponding to the graphical objects for the first screen;
    reconstructing means for reconstructing the compositing tree based on the transmitted description and identifiers, wherein the transmitted identifiers are mapped to second descriptions of each of the graphical objects stored within the second computer;
    display means for displaying the first screen of the interface according to the reconstructed compositing tree;
    further transmitting means for transmitting an event generated by the second computer to the first computer;
    modifying means for modifying any of the graphical objects affected by the event, wherein the graphical objects affected by the event are animation objects; and
    updating means for updating the compositing tree based on the modified graphical objects in order to display at least one subsequent screen of the interface.

15. An apparatus according to claim 14, further comprising buffer means for storing the description of the constructed compositing tree, within the first computer.

16. An apparatus for displaying an interface comprising a plurality of screens, on a first computer, the interface being generated by a second computer, said apparatus comprising:
    constructing means for constructing a compositing tree comprising one or more graphical objects and one or more compositing operations for compositing the graphical objects for a first screen of the interface;
    transmitting means for transmitting a description of the compositing tree, to the first computer, together with object identifiers corresponding to the graphical objects for the first screen;
    reconstructing means for reconstructing the compositing tree based on the transmitted description and identifiers, wherein the transmitted identifiers are mapped to a description of each of the graphical objects stored within the first computer;
    display means for displaying the first screen of the interface according to the reconstructed compositing tree;
    further transmitting means for transmitting an event generated by the first computer to the second computer;
    modifying means for modifying any of the graphical objects affected by the event, wherein the graphical objects affected by the event are animation objects; and
    updating means for updating the compositing tree based on the modified graphical objects in order to display a least one subsequent screen of the interface.

17. An apparatus according to claim 16, further comprising storing means for storing a description of each of the graphical objects together with the associated identifiers, within the second computer.

18. An apparatus according to claim 16, further comprising buffer means for storing the description of the constructed compositing tree, within the second computer.

19. A computer-readable storage medium storing a computer program, executable on a first computer for generating an interface comprising a plurality of screens, for display by a second computer, said program comprising:
    code for constructing a compositing tree comprising one or more graphical objects and one or more compositing operations for compositing the graphical objects for a first screen of the interface;
    code for transmitting a description of the compositing tree, to the second computer, together with object identifiers corresponding to the graphical objects for the first screen;
    code for reconstructing the compositing tree based on the transmitted description and identifiers, wherein the transmitted identifiers are mapped to a description of each of the graphical objects stored within the second computer;
    code for displaying the first screen of the interface according to the reconstructed compositing tree;
    code for transmitting an event generated by the second computer to the first computer;
    code for modifying any of the graphical objects affected by the event;
    wherein the graphical objects affected by the event are animation objects; and
    code for updating the compositing tree based on the modified graphical objects in order to display at least one subsequent screen of the interface.

20. A computer-readable storage medium storing a computer program, executable on a first computer, for generating an interface, comprising a plurality of screens, for display by a second computer, each of the screens comprising one or more graphical objects, wherein each of the graphical objects has an associated identifier, said program comprising:
    code for storing a first description of each of the graphical objects together with the associated identifiers, within the first computer;
    code for constructing a hierarchical compositing tree utilising one or more of the stored first descriptions, the compositing tree comprising one or more graphical objects and one or more compositing operations for compositing the graphical objects for a first screen of the interface;
    code for transmitting a description of the compositing tree, to the second computer, together with object identifiers corresponding to the graphical objects for the first screen;

code for reconstructing the compositing tree based on the transmitted description and identifiers, wherein the transmitted identifiers are mapped to second descriptions of each of the graphical objects stored within the second computer;

code for displaying the first screen of the interface according to the reconstructed compositing tree;

code for transmitting an event generated by the second computer to the first computer;

code for modifying any of the graphical objects affected by the event;

wherein the graphical objects affected by the event are animation objects; and code for updating the compositing tree based on the modified graphical objects in order to display at least one subsequent screen of the interface.

21. A computer-readable storage medium storing a computer program, executable on a first computer, for displaying an interface comprising a plurality of screens, the interface being generated by a second computer, said program comprising:

code for constructing a compositing tree comprising one or more graphical objects and one or more compositing operations for compositing the graphical objects for a first screen of the interface;

code for transmitting a description of the compositing tree, to the first computer, together with object identifiers corresponding to the graphical objects for the first screen;

code for reconstructing the compositing tree based on the transmitted description and identifiers, wherein the transmitted identifiers are mapped to a description of each of the graphical objects stored within the first computer;

code for displaying the first screen of the interface according to the reconstructed compositing tree;

code for transmitting an event generated by the first computer to the second computer;

code for modifying any of the graphical objects affected by the event;

wherein the graphical objects affected by the event are animation objects; and code for updating the compositing tree based on the modified graphical objects in order to display a least one subsequent screen of the interface.

* * * * *